United States Patent [19]

Stephenson

[11] Patent Number: 5,715,493
[45] Date of Patent: Feb. 3, 1998

[54] APPARATUS AND ELECTRONIC CAMERA AND ASSOCIATED PRINTER WITH LIGHT TIGHT STORAGE RECEPTACLE

[75] Inventor: Stanley W. Stephenson, Rochester, N.Y.

[73] Assignee: Eastman Kodak Company, Rochester, N.Y.

[21] Appl. No.: 778,233

[22] Filed: Jan. 8, 1997

[51] Int. Cl.$^6$ .................... G03B 29/00; G03B 17/50; H04N 5/30
[52] U.S. Cl. .................... 396/429; 396/30; 358/906; 358/909.1
[58] Field of Search .................. 396/30, 429, 430, 396/374, 33, 36, 37; 358/296, 302, 401, 501, 906, 909.1; 348/207, 373, 552, 839; 347/1, 2, 108

[56] References Cited

U.S. PATENT DOCUMENTS

| | | | |
|---|---|---|---|
| 4,262,301 | 4/1981 | Erlichman | 358/906 |
| 4,768,050 | 8/1988 | Beery | 396/614 |
| 4,937,676 | 6/1990 | Finelli et al. | 358/906 |
| 5,032,911 | 7/1991 | Takimoto | 358/501 |
| 5,049,902 | 9/1991 | Duke | 347/172 |
| 5,122,432 | 6/1992 | Hammann, IV et al. | 430/138 |
| 5,164,751 | 11/1992 | Weyer | 396/430 |
| 5,493,409 | 2/1996 | Maeda et al. | 396/429 |
| 5,619,738 | 4/1997 | Petruchik et al. | 396/374 |

*Primary Examiner*—A. A. Mathews
*Attorney, Agent, or Firm*—Raymond L. Owens

[57] ABSTRACT

Apparatus for capturing and printing images on a photosensitive sheet is disclosed. The apparatus includes a camera for electronically storing an image of a subject and having a display for displaying such stored image and includes an alignment structure. The apparatus further includes a printer having a light tight storage receptacle for receiving a stack of photosensitive sheets and for imaging the display image onto photosensitive sheets including a transfer arrangement for transferring a photosensitive sheet from the light tight storage receptacle to an exposure position for receiving an image from the display. The apparatus further includes optics for focusing the display area onto said photosensitive sheet, and provides electronic communication between the electronic camera and the printer so that the printing area of said display is imaged on the photosensitive sheet at the exposure position.

6 Claims, 3 Drawing Sheets

APPARATUS AND ELECTRONIC CAMERA AND ASSOCIATED PRINTER WITH LIGHT TIGHT STORAGE RECEPTACLE

FIELD OF THE INVENTION

The present invention relates to electronic cameras and to the printing of images produced by such camera.

BACKGROUND OF THE INVENTION

It is known in the prior art to provide an electronic camera which uses an area image sensor. Digital images produced from the image sensor are stored in memory and these images can be shown on a display so that the user can determine which image should be stored for use in producing hard copy images. Typically, these images can be stored in a magnetic disk or a compact PCMCIA Flash RAM Card or dedicated memory within the electronic camera.

A shortcoming with prior electronic cameras is that data must be transmitted from the electronic camera to printer. Interfaces must be present to transfer the data. As disclosed in U.S. Pat. No. 5,032,911, printers that write to light sensitive media print must have means within the printer that operate on received data and convert the data into modulated light to mark the photosensitive sheet. Many newer electronic cameras incorporate light emitting displays to view a captured image. However, the apparatus for producing such images is not available for light writing onto photosensitive media.

SUMMARY OF THE INVENTION

It is an object of the present invention to make use of an electronic image display in an electronic camera to write directly onto light sensitive media which can effectively provide a hard copy.

This object is achieved by apparatus for capturing and printing images on a photosensitive sheet, comprising:

(a) a camera for electronically storing an image of a subject and having a display for displaying such stored image and including alignment means;

(b) a printer including light tight storage means for receiving a stack of photosensitive sheets;

(c) means for imaging the display image onto photosensitive sheets including:
   (i) transfer means for transferring a photosensitive sheet from the light tight storage means to an exposure position for receiving an image from the display;
   (ii) optical means for focusing the display area onto said photosensitive sheet; and (d) means for providing electronic communication between the electronic camera and the printer so that the printing area of said display is imaged on the photosensitive sheet at the exposure position.

ADVANTAGES

A feature of this invention is that a camera display is used to directly write onto the light sensitive sheet. The printer does not require the use of a shutter. Moreover, electronic interconnecting between the printer and the camera permits the electronic printer to sequence operation of the camera display in conjunction with movement of the photosensitive sheet to produce an image on the photosensitive sheet.

DETAILED DESCRIPTION OF THE INVENTION

The invention is directed to a compact printer used in conjunction with electronic cameras. Such cameras often have a flat panel color display that is used to frame and/or review capture images. Separable printers exist that receive data from said electronic capture devices. Typically, interface electronics is disposed in each device and data is transmitted from the electronic camera to the printer.

Figure 1:
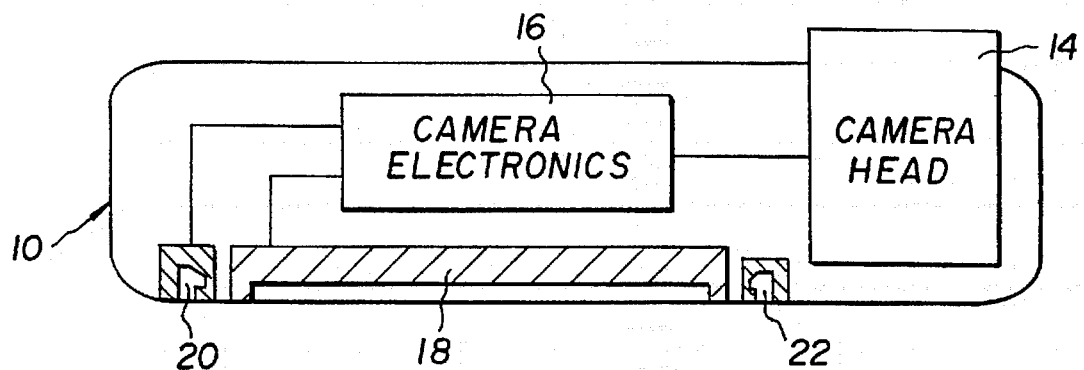
FIG. 1 is a top section view of an electronic camera which is adapted to be coupled to a printer in accordance with the present invention.
Figure 2:
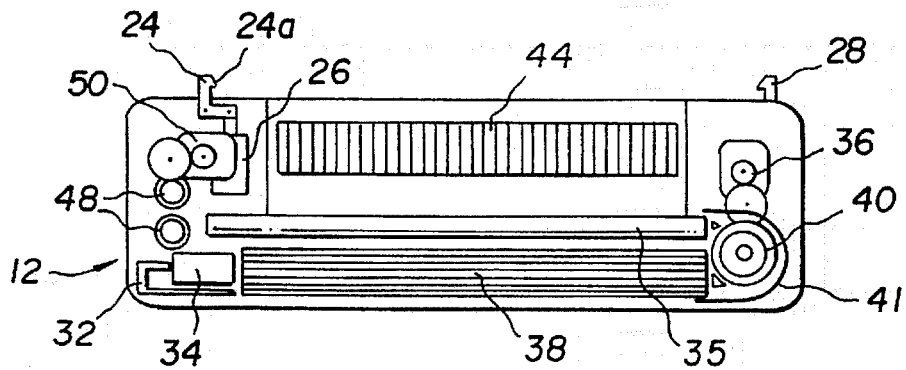
FIG. 2 is a top section view of the printer which is adapted to be coupled to the electronic camera of FIG. 1.

Turning now to FIG. 1, an electronic camera 10 is shown, and to FIG. 2 where a printer 12 is shown. Electronic camera 10 is of conventional design and can capture either still or motion images. Images are captured by camera head 14 and transferred to camera electronics 16. Camera electronics 16 is capable of displaying still images on camera display 18. Camera display 18 can be for instance a LCD or organic polymer display system of conventional design.

Figure 3:
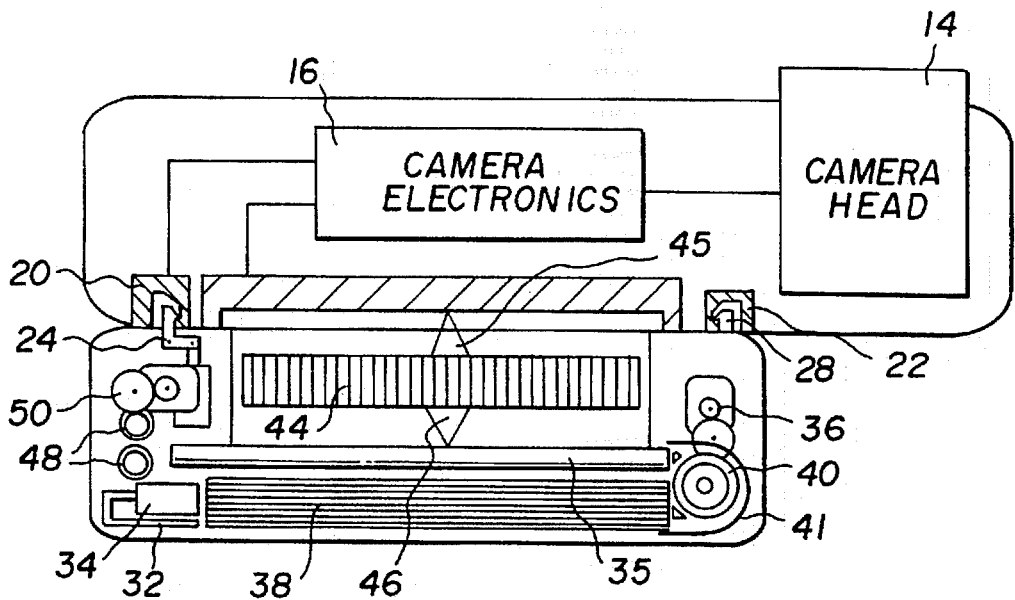
FIG. 3 shows the printer of FIG. 2 attached to the camera of FIG. 1.
Figure 4:
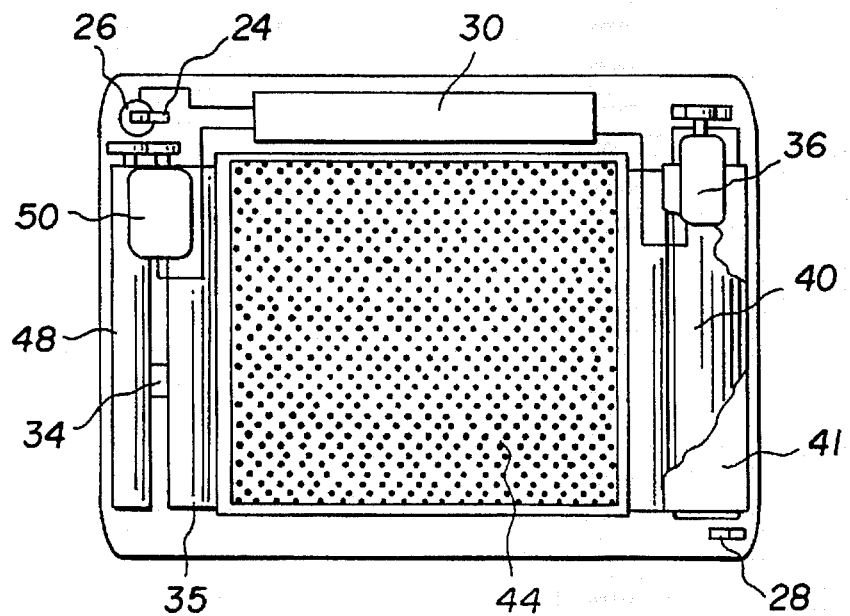
FIG. 4 is a front sectional view showing portions of the printer of FIG. 2.

Turning to FIG. 3, electronic camera 10, in accordance with the present invention, includes the additional modification of an active socket 20 and a passive socket 22 for the purpose of securing the printer 12 over camera display 18. Active socket 20 incorporates electronic sensing circuitry to communicate with printer 12. Active socket 20 can include an electrical connection coupled to the camera electronics 16 and facilitates communication with the printer 12. Alternatively, a light sensing/transmitting assembly can be incorporated in or near the active socket 20.

Figure 5:
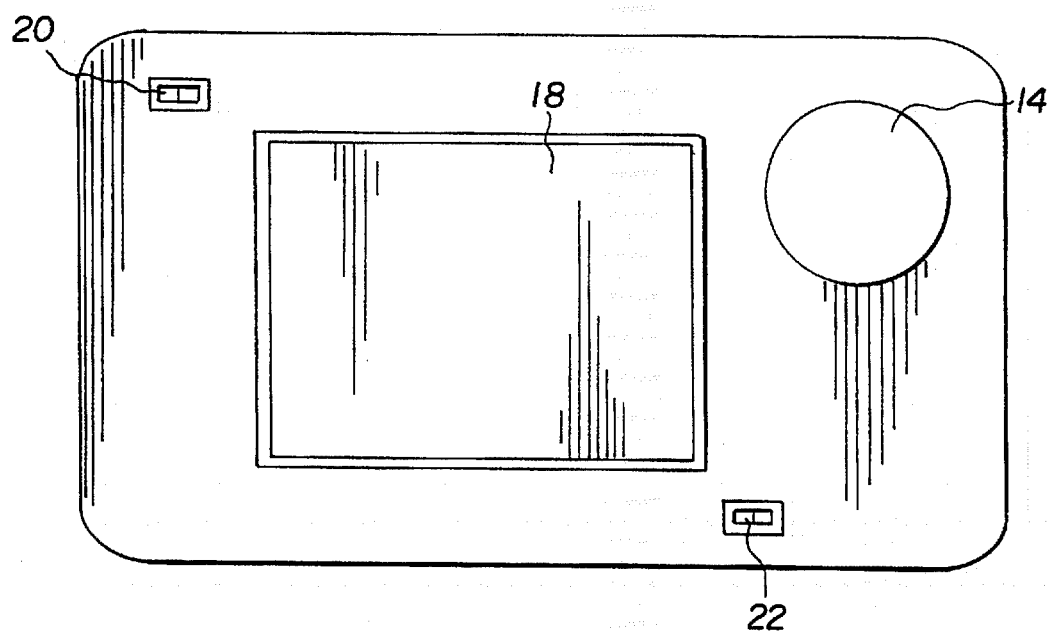
FIG. 5 is a rear view of the electronic camera shown in FIG. 1.

The printer 12 has an active latch 24 and a passive latch 28 that permits the printer to be secured over the camera display 18. In this embodiment the latches 24 and 28 are hooked and secure to matching detail 24a formed in the sockets 20 and 22 of camera 10. The rear view of the camera in FIG. 5 shows the position of the active socket 20 and the passive socket 22 and camera display 18. A latch driver 26 permits the selective securing and release of printer 12 from camera 10 under control of printer electronics 30. A compliant, light tight mask (not shown) is disposed on the printer so that coupling printer 12 to electronic camera 10 mask camera display 18.

Printer 12 contains a stack of media sheets 38. These sheets are light sensitive and are loaded into the camera and stored in light sensitive manner as is known in the art. Photosensitive sheets can be found in current art as instant silver-halide sheets or pressure sensitive microencapsulated crushable color particles such as disclosed in U.S. Pat. Nos. 4,768,050, 5,049,902, and 5,122,432. Alternatively, images can be stored on photographic film and then stored and chemically processed at a later time.

Shown in FIG. 3, picker 32 is moved by picker drive 34 to urge photosensitive sheet 42 into urge roller 40. Urge roller 40 is driven by urge roller drive 36. Urge roller guide 41 is disposed around the periphery of urge roller 40 to guide photosensitive sheet 42 onto platen 35. A printing optic 44 is used to focus an image onto photosensitive sheet 42 as the photosensitive sheet 42 lies on platen. 35. Printing optic 44 can be an array of gradient index rods that have been formed into a linear array. Printing optic 44 can be formed from Nippon Sheet Glass rod lens array type 20B which has a total conjugate 15.1 mm. The actual element is 6.89 mm tall and first working distance 45 and second working distance 46 are 4.10 mm.

The sockets and latches are dimensionally controlled so as to align printing optic 44 with the light emitting elements of camera display 18. First working distance 45 should be located by the interface to focus on the light emitting elements of the camera display 18. Second working distance 46 is provided for forming an image on the imaging surface of photosensitive sheet 42 as it lies on platen 35. Printing optic 44 is accurately positioned relative to the camera display 18 when the printer is secured to the camera 10.

Signals from printer electronics 30 are transmitted through an interface formed by the active latch 24 and the active socket 20. Timing signals are received by camera electronics 16. Camera electronics 16 turns the camera display 18 on and off under the control of printer electronics 30. Printer electronics 30 turns off the display to permit a photosensitive sheet to be transferred onto the platen by urge roller 40. Further signals reactivate camera display 18 under control of printer electronics 30. A third transmission turns printer display 18 off until photosensitive sheet 42 has been processed.

After exposure, photosensitive sheet 42 is further urged by urge roller 40 into processing rollers 48. Processing rollers 48 are turned by process roller drive 50 to process the latent image formed on photosensitive sheet 42. In the case of silver halide imaging, a pod of chemicals on photosensitive sheet 42 is burst by processing rollers 48. The chemicals are spread across the image of photosensitive sheet 42 as photosensitive sheet 42 passes through processing rollers 48. Said chemicals operate on the latent image to create a permanent colored dye image on photosensitive sheet 42. In the case of crushable media, the rollers apply pressure to micro-beads containing the latent image. Burst microbeads release dye chemistries within photosensitive sheet 42 to create a permanent color image.

Figure 6A:
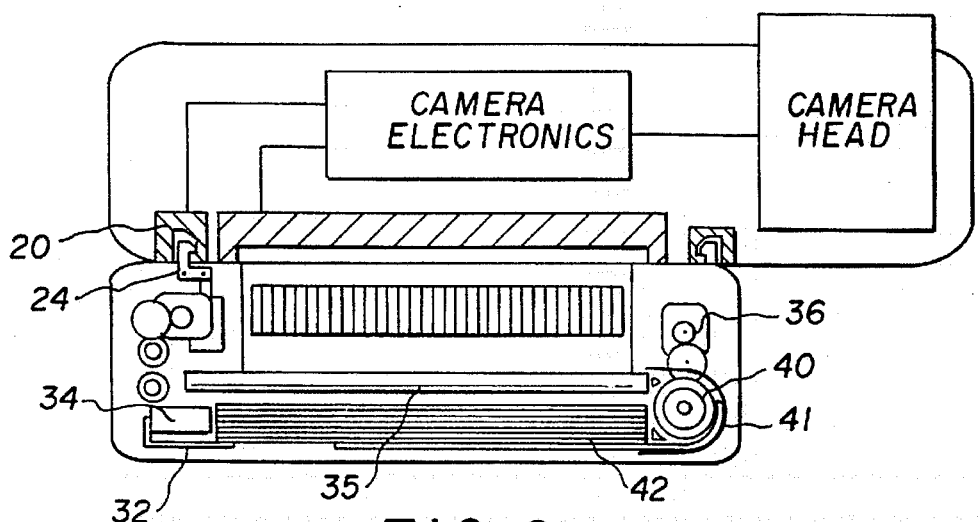
FIGS. 6a, 6b, and 6c show an operating sequence of the camera printer arrangement.
Figure 6B:
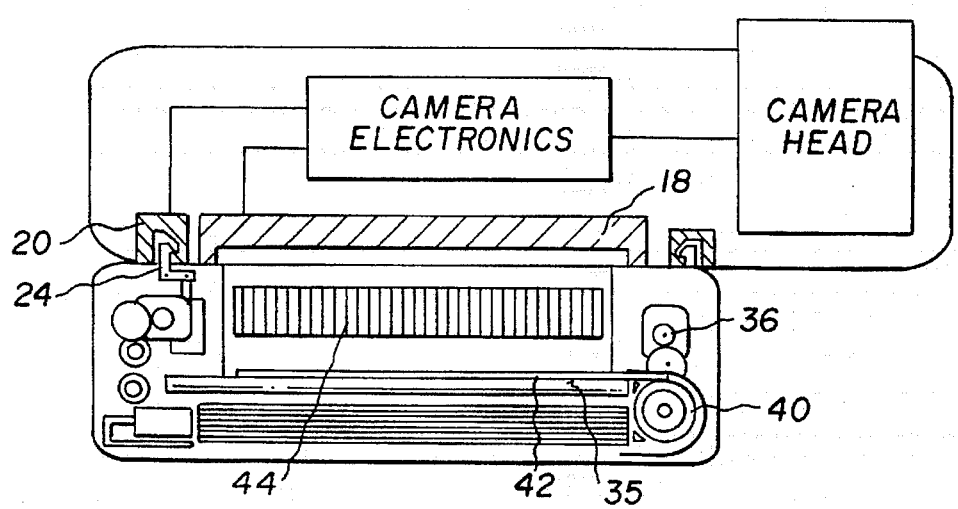
Figure 6C:
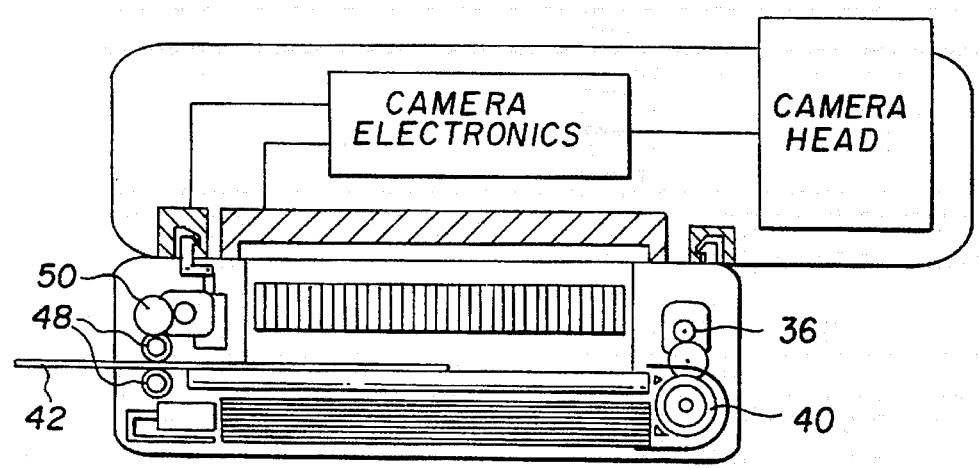

Operation of the invention is shown in FIGS. 6a-6c. In FIG. 6a, an operator has mounted printer 12 onto electronic camera 10. Latches 24 and 28 secure printer 12 in a light tight manner to camera display 18 on electronic camera 10. The operator signals the start of printing using printer electronics 30. Printer 12 signals camera electronics 16 to turn off camera display 18. Printer electronics 30 then activate picker drive 34 and urge roller drive 36. Picker 32 moves under the actuation of picker drive 34 to move photosensitive sheet 42 into rotating urge roller 40. In FIG. 6b sensors (not shown) detect that photosensitive sheet 42 is positioned onto platen 35. Printer electronics then signals camera electronics 16 to turn camera display 18 on for a time period that provides proper exposure of photosensitive sheet 42. Printer electronics 30 is sensitive to the light sensitivity of photosensitive sheet 42 and sets exposure time correspondingly.

FIG. 6c shows the apparatus after exposure of photosensitive sheet 42. Camera display 18 is off. Printer electronics 30 activates urge roller drive 36 and processing roller drive 50. Photosensitive sheet 42 is driven by urge roller 40 into processing rollers 48. Processing rollers 48 grip and drive photosensitive sheet 42 out of printer 12, providing an operator with a color record of camera display 18.

The use of the latch driver 26 under the control of printer electronics 30 ensures that printer 12 is not detached from electronic camera 10 during image transmission from camera display 18. An operator detaches printer 12 from electronic camera 10 using an interface to printer electronics 30 such as a conventional switch. Printer electronics 30 then activates latch driver 26 to permit removal of printer 12 from camera 10.

The invention has been described in detail with particular reference to a certain preferred embodiment thereof, but it will be understood that variations and modifications can be effected within the spirit and scope of the invention.

PARTS LIST 10 electronic camera
12 printer
14 camera head
16 camera electronics
18 camera display
20 active socket
22 passive socket
24 active latch
24a detail
26 latch driver
28 passive latch
30 printer electronics
31 light tight storage receptacles
32 picker
34 picker drive
35 platen
36 urge roller drive
38 media sheets
40 urge roller
41 urge roller guide
42 photosensitive sheet
43 cover sheet
44 printing optic
45 first working distance
46 second working distance
48 processing rollers
50 processing roller drive

I claim:

1. Apparatus for capturing and printing images on photosensitive sheets, comprising:
   (a) a camera for electronically storing an image of a subject and having a display for displaying such stored image;
   (b) a printer including light tight storage receptacle means for receiving a stack of photosensitive sheets;
   (c) means for imaging the display image onto photosensitive sheets including:
      (i) transfer means for transferring a photosensitive sheet from the light tight storage receptacle means to an exposure position for receiving an image from the display;
      (ii) optical means for focusing a display area onto said photosensitive sheet; and
   (d) means for providing electronic communication between the electronic camera and the printer so that the display image is imaged on the photosensitive sheet at the exposure position.

2. The apparatus of claim 1 wherein the communication means further includes an active socket which includes electronic sensing circuitry for communicating with the printer.

3. The apparatus of claim 1 further including means for preventing the printer from being detached from the camera when there is electronic communication between the display and the printer.

4. The apparatus of claim 1 wherein the optical means includes rod lens arrays.

5. The apparatus of claim 1 wherein the exposure position is defined by a platen disposed in relation to the display and wherein sheets are fed from the stack to the platen for receiving an image from the display.

6. Apparatus for capturing and printing images on photosensitive sheets, comprising:

(a) a camera for electronically storing an image of a subject and having a display for displaying such stored image;

(b) a printer including light tight storage receptacle means for receiving a stack of photosensitive sheets;

(c) means for imaging the display image onto photosensitive sheets including:

(i) transfer means for transferring a photosensitive sheet from the light tight storage receptacle means to an exposure position for receiving an image from the display;

(ii) optical means for focusing a display area onto said photosensitive sheet;

(d) means for providing electronic communication between the electronic camera and the printer so that the display image is imaged on the photosensitive sheet at the exposure position; and (e) means coupled to the camera display for sensing the type of photosensitive sheet for controlling exposure of the photosensitive sheet by the camera display.

\* \* \* \* \*